(12) United States Patent
Saito

(10) Patent No.: US 9,712,470 B2
(45) Date of Patent: Jul. 18, 2017

(54) SERVER APPARATUS ENABLING POSTING OF MESSAGES, METHOD OF CONTROLLING THE SAME, INFORMATION PROCESSING APPARATUS, INFORMATION PROCESSING SYSTEM, AND STORAGE MEDIUM

(71) Applicant: CANON KABUSHIKI KAISHA, Tokyo (JP)

(72) Inventor: Satoko Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 416 days.

(21) Appl. No.: 14/322,186

(22) Filed: Jul. 2, 2014

(65) Prior Publication Data

US 2015/0012603 A1   Jan. 8, 2015

(30) Foreign Application Priority Data

Jul. 8, 2013   (JP) ................................. 2013-142592

(51) Int. Cl.
*H04L 12/58* (2006.01)
(52) U.S. Cl.
CPC .............. *H04L 51/16* (2013.01); *H04L 51/32* (2013.01)
(58) Field of Classification Search
CPC .................................. H04L 51/16; H04L 51/32
See application file for complete search history.

(56) References Cited

U.S. PATENT DOCUMENTS

| | | | | |
|---|---|---|---|---|
| 9,444,648 B1* | 9/2016 | King | ................... | G06Q 10/107 |
| 2004/0236721 A1* | 11/2004 | Pollack | ............ | G06F 17/30699 |
| 2006/0036685 A1* | 2/2006 | Canning | ................ | H04L 67/32 709/204 |
| 2012/0284648 A1* | 11/2012 | Marshall | ............... | G06Q 50/01 715/753 |
| 2013/0198296 A1* | 8/2013 | Roy | ..................... | G06Q 10/107 709/206 |
| 2013/0325925 A1* | 12/2013 | Mizuki | ................... | H04L 67/42 709/203 |
| 2014/0108569 A1* | 4/2014 | Sasamoto | .............. | H04L 51/32 709/206 |

FOREIGN PATENT DOCUMENTS

JP   2010-267218 A   11/2010

* cited by examiner

*Primary Examiner* — Joe Chacko
(74) *Attorney, Agent, or Firm* — Rossi, Kimms & McDowell LLP

(57) ABSTRACT

A server apparatus which, when a viewer inputs a message, such as a comment, makes it possible to post a relevant comment by referring to another comment posted slightly earlier. Upon receipt of a posting request for posting a message from an information processing apparatus, a comment manager generates a posting reception notification indicative of information related to a reception sequence number of the posting request. The comment manager transmits the posting reception notification to the information processing apparatus. The comment manager receives not only the posted message but also the posting reception notification, and stores the message in a memory if there is no posting request made from another apparatus with a reception sequence number later in sequential order than the reception sequence number indicated by the posting reception notification.

17 Claims, 11 Drawing Sheets

*FIG. 3*

| THEME ID | ~301 |
|---|---|
| REGISTRATION SEQUENCE NUMBER | ~302 |
| INTERVENING REGISTRATION SEQUENCE NUMBER | ~303 |
| COMMENT | ~304 |

FIG. 6A

| | |
|---|---|
| THEME ID | ~601 |
| REGISTRATION SEQUENCE NUMBER | ~602 |
| COMMENT | ~603 |

FIG. 6B

| | |
|---|---|
| THEME ID | ~604 |
| REGISTRATION SEQUENCE NUMBER | ~605 |
| TOKEN ACQUISITION DATE AND TIME | ~606 |
| COMMENT | ~607 |

FIG. 6C

| | |
|---|---|
| THEME ID | ~608 |
| ISSUE DATE AND TIME | ~609 |
| INPUT TOKEN | ~610 |

SERVER APPARATUS ENABLING POSTING OF MESSAGES, METHOD OF CONTROLLING THE SAME, INFORMATION PROCESSING APPARATUS, INFORMATION PROCESSING SYSTEM, AND STORAGE MEDIUM

BACKGROUND OF THE INVENTION

Field of the Invention

The present invention relates to a server apparatus enabling posting of messages, a method of controlling the same, an information processing apparatus, an information processing system, and a storage medium, and more particularly to a server apparatus that registers posted messages, such as comments.

Description of the Related Art

In is a general practice that a larger number of unspecified viewers freely post and view messages, such as comments, on an electronic bulletin board or the like which is installed in a server apparatus, such as a comment management server. The comment management server organizes the posted comments on a theme-by-theme basis and stores them in the order of posting of the comments. The comment management server displays the comments on the electronic bulletin board on a theme-by-theme and time-series basis in the posting order. Under the circumstances, comments are sometimes simultaneously posted by different viewers (users), requiring storage thereof in the posting order.

On the other hand, in a so-called electronic conference system, there has been used a method in which the comment management server manages position information of posted comments, and when a remarker is posting a comment, if a comment from another remarker is attempted to be placed in the same area (the same position) as that of the comment to be made by the remarker, posting of the comment by the other remarker is suppressed (see Japanese Patent Laid-Open Publication No. 2010-267218).

By the way, even if the method disclosed in Japanese Patent Laid-Open Publication No. 2010-267218 is desired to be applied to the electronic bulletin board and the like, the electronic bulletin board has no position information of comments, and hence even when different viewers are posting comments simultaneously, it is impossible to suppress posting of the comments by them. Further, when a viewer inputs a comment, it is impossible to check a comment posted from another viewer immediately before, so that posted comments sometimes have contents of the same kind, and also a comment input by one viewer sometimes becomes irrelevant to the preceding message.

SUMMARY OF THE INVENTION

The present invention provides a server apparatus which, when a viewer inputs a message, such as a comment, makes it possible to post a relevant comment by referring to another comment posted slightly earlier, a method of controlling the same, an information processing apparatus, an information processing system, and a storage medium.

In a first aspect of the present invention, there is provided server apparatus that is connected to at least one information processing apparatus via a network, for receiving a message posted from the information processing apparatus to make the message open to the public, comprising a generation unit configured to, whenever receiving a posting request for posting a message from the information processing apparatus, generate a posting reception notification which indicates information related to a reception sequence number of the posting request, a transmission unit configured to transmit the posting reception notification to the information processing apparatus, and a storage unit configured to receive not only the message posted from the information processing apparatus but also the posting reception notification as reception information, and store the message in a memory if there is no posting request from another information processing apparatus which has been made with a reception sequence number later in sequential order than the reception sequence number indicated by the information related to the reception sequence number indicated by the reception information.

In a second aspect of the present invention, there is provided an information processing apparatus connected to a server apparatus via a network, wherein the server apparatus receives a message posted from the information processing apparatus, for making the message open to the public, and includes a generation unit configured to, whenever receiving a posting request for posting a message from the information processing apparatus, generate a posting reception notification which indicates information related to a reception sequence number of the posting request, a transmission unit configured to transmit the posting reception notification to the information processing apparatus, and a storage unit configured to receive not only the message posted from the information processing apparatus but also the posting reception notification as reception information, and store the message in a memory if there is no posting request from another information processing apparatus which has been made with a reception sequence number later in sequential order than the reception sequence number indicated by the information related to the reception sequence number indicated by the reception information, the information processing apparatus comprising a display control unit configured to, upon receipt of the transmission reception notification from the server apparatus, display a message input screen for inputting the message, on a display section.

In a third aspect of the present invention, there is provided an information processing system including a server apparatus that is connected to at least one information processing apparatus via a network, for receiving a message posted from the information processing apparatus to make the message open to the public, and the at least one information processing apparatus connected to server apparatus via the network, wherein the server apparatus comprises a generation unit configured to, whenever receiving a posting request for posting a message from the information processing apparatus, generate a posting reception notification which indicates information related to a reception sequence number of the posting request, a transmission unit configured to transmit the posting reception notification to the information processing apparatus, and a storage unit configured to receive not only the message posted from the information processing apparatus but also the posting reception notification as reception information, and store the message in a memory if there is no posting request from another information processing apparatus which has been made with a reception sequence number later in sequential order than the reception sequence number indicated by the information related to the reception sequence number indicated by the reception information, and wherein the information processing apparatus comprises a display control unit configured to, upon receipt of the transmission reception notification from the server apparatus, display a message input screen for inputting the message, on a display section.

In a fourth aspect of the present invention, there is provided a method of controlling a server apparatus that is connected to at least one information processing apparatus via a network, for receiving a message posted from the information processing apparatus to make the message open to the public, comprising generating, whenever receiving a posting request for posting a message from the information processing apparatus, a posting reception notification which indicates information related to a reception sequence number of the posting request, transmitting the posting reception notification to the information processing apparatus, and receiving not only the message posted from the information processing apparatus but also the posting reception notification as reception information, and storing the message in a memory if there is no posting request from another information processing apparatus which has been made with a reception sequence number later in sequential order than the reception sequence number indicated by the information related to the reception sequence number indicated by the reception information.

In a fifth aspect of the present invention, there is provided a non-transitory computer-readable storage medium storing a computer-executable program for executing a method of controlling a server apparatus that is connected to at least one information processing apparatus via a network, for receiving a message posted from the information processing apparatus to make the message open to the public, wherein the method comprises generating, whenever receiving a posting request for posting a message from the information processing apparatus, a posting reception notification which indicates information related to a reception sequence number of the posting request, transmitting the posting reception notification to the information processing apparatus, and receiving not only the message posted from the information processing apparatus but also the posting reception notification as reception information, and storing the message in a memory if there is no posting request from another information processing apparatus which has been made with a reception sequence number later in sequential order than the reception sequence number indicated by the information related to the reception sequence number indicated by the reception information.

According to the present invention, whenever a positing request for posting a message is received from the information processing apparatus, the server apparatus transmits a posting reception notification indicative of the date and time of reception of the posting request to the information processing apparatus, and receives not only the message posted from the information processing apparatus but also the posting reception notification as reception information. Then, the server apparatus stores the message in a memory if there is no message no posting request from another information processing apparatus which has been made with a reception sequence number later in sequential order than the reception sequence number indicated by the information related to the reception sequence number indicated by the reception information. As a consequence, when a viewer inputs a message, such as a comment, using the information processing apparatus, it is possible to post a relevant message by referring to another comment posted slightly earlier.

Further features of the present invention will become apparent from the following description of exemplary embodiments (with reference to the attached drawings).

BRIEF DESCRIPTION OF THE DRAWINGS

FIG. 3 is a view of an example of a data structure concerning comment management performed by the comment management server appearing in FIG. 1.

FIGS. 6A to 6C are views of examples of data structures concerning comment management performed by a comment management server according to a second embodiment of the present invention, in which FIG. 6A shows an example of a data structure concerning the comment management, FIG. 6B shows an example of a data structure for managing provisional registration of a comment, and FIG. 6C shows an example of a data structure for managing an input token.

DESCRIPTION OF THE EMBODIMENTS

The present invention will now be described in detail below with reference to the accompanying drawings showing embodiments thereof.

Figure 1:
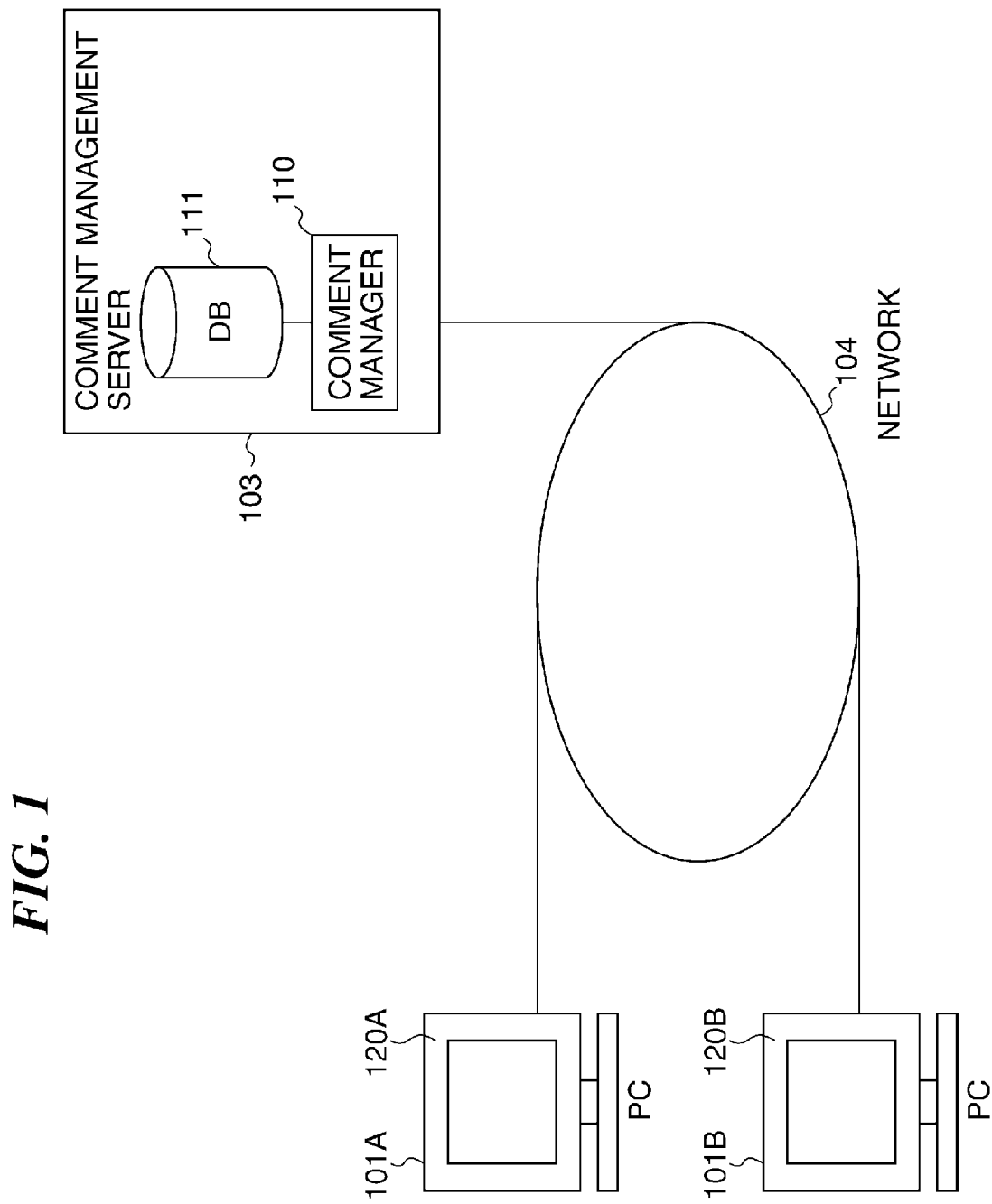
FIG. 1 is a view of an information processing system including information processing apparatuses (PCs) and a server apparatus (comment management server), according to a first embodiment of the present invention.

FIG. 1 is a view of an information processing system including information processing apparatuses and a server apparatus, according to a first embodiment of the present invention. First, the outline of processing performed by the information processing system will be described with reference to FIG. 1.

The information processing system illustrated in FIG. 1 is a comment display system for displaying and disclosing messages, such as comments, on an electronic bulletin board. The server apparatus (hereinafter referred to as the "comment management server") 103 is connected to a plurality of information processing apparatuses (hereinafter referred to as the "PCs": only a PC 101A and a PC 101B are shown in FIG. 1) via a network 104. In the following, a description will be given assuming that the connected PCs are only the PC 101A and the PC 101B.

A user posts comments to the comment management server 103 using the PC 101A or the PC 101B. Further, the user is capable of viewing comments posted to the comment management server 103 using the PC 101A or the PC 101B.

That is, in the PC 101A or the PC 101B, by operating a program (posting/viewing program) 120A or 120B installed therein, it is possible to access the comment management server 103 and post or view comments, using a standard protocol, such as HTTP. When a comment to be posted is input, the input comment is displayed on a display section of the PC 101A or the PC 101B, and when the user views posted comments, they are displayed on the display section of the PC 101A or the PC 101B.

Note that when comments are displayed on the display section, the manner of display of the comments is not particularly limited. The comments may be displayed on a time-series basis or in a manner classified according to a user's designation.

The comment management server 103 includes a comment manager 110 and a database (DB) 111. The database 111 stores comments (managed comments) and information associated with each comment. A user, who desires to view comments, starts e.g. the posting/viewing program 120A in the PC 101A, and selects a theme to view the comments, according to an instruction from the posting/viewing program 120A.

Note that the theme mentioned here may have a form, such as a title, represented by characters, or may be a content, typified by an image, insofar as it serves as a subject of a comment.

When the user selects a theme and gives an instruction for viewing the theme, the posting/viewing program 120A operating on the PC 101A notifies the comment management server 103 of the theme of comments that the user desires to view, via the network 104. When the comment management server 103 receives the theme, the comment manager 110 refers to the database 111, and returns to the PC 101A comments stored in the database 111 in association with the notified theme and a latest registration sequence number.

Here, a largest value is given to a latest comment registered at the current time point. Further, the above-mentioned theme and latest registration sequence number form the comment-associated information.

In the PC 101A, the comments returned from the comment management server 103 and a comment input area to which the user inputs a comment are displayed on the display section according to an instruction from the posting/viewing program 120A. When the user terminates the input of the comment and gives an instruction for posting the comment, the posting/viewing program 120A operating on the PC 101A notifies the comment management server 103 of the comment and the latest registration sequence number via the network 104.

When the comment management server 103 receives the comment and the latest registration sequence number, the comment manager 110 compares the latest registration sequence number and the registration sequence number of the latest comment stored in the database 111. When the two are the same (i.e. coincide with each other), the comment manager 110 stores the notified comment in the database 111.

Here, assuming that another user has posted a comment using the PC 101B during a time period between comment viewing and comment posting by the user using the PC 101A, the latest registration sequence number notified from the PC 101A to the comment management server 103, and the registration sequence number of the latest comment stored in the database 111 are different.

In this case, in the comment management server 103, the comment manager 110 notifies the PC 101A that the user is requested to know that the posted comments have been updated.

In the PC 101A, the posting/viewing program 120A displays on the display section a message to the effect that the posted comments have been updated, and updates the display of the comment list. Then, in the PC 101A, when the user posts a new comment, the posting/viewing program 120A newly notifies the comment management server 103 of the latest registration sequence number obtained when the PC 101A received the notification that the posted comments have been updated, together with the comment.

Further, when the user performs an operation for intervening posting using the PC 101A, the posting/viewing program 120A notifies the comment management server 103 of an intervening posting flag, the latest registration sequence number obtained first, and the comment. In the comment management server 103, upon receipt of the intervening posting flag, the comment manager 110 stores the latest registration sequence number and the comment as an intervening comment in the database 111.

As described above, even if another user has posted a comment before a certain user terminates posting of a comment after viewing a comment list, the user can check the comment list and then perform intervening posting or new posting of the comment. Therefore, it is possible not only to prevent the comment posted by the user from having contents similar to those of the preceding comment posted by the other user but also to prevent the contents of the comment posted by the user from being irrelevant in context to those of the preceding comment posted by the other user.

Although in the example illustrated in FIG. 1, for convenience of explanation, the description has been given of the case where comment viewing and comment posting are performed using the PC 101A or the PC 101B, the same processing is performed even when comment viewing and comment posting are performed using a plurality of PCs. Further, a general browser may be used in place of the posting/viewing program.

Figure 2:
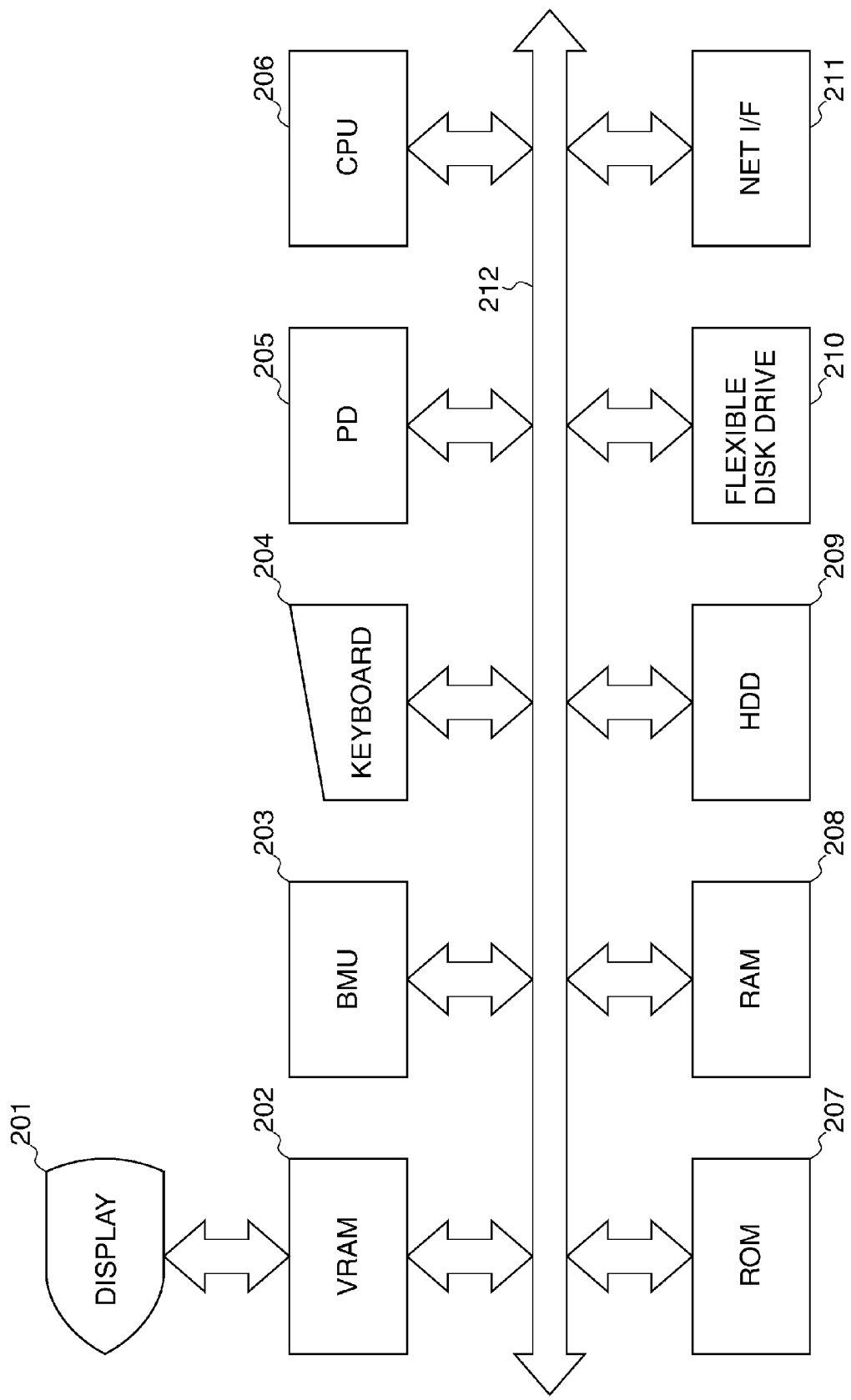
FIG. 2 is a block diagram showing an example of the hardware configuration of each of the PCs and the comment management server shown in FIG. 1.

FIG. 2 is a block diagram showing an example of the hardware configuration of each of the PCs and the comment management server shown in FIG. 1. Note that since the hardware configuration of the PCs and the comment management server are the same, the following description will be given of that of the PC 101A, by way of example.

The PC 101A comprises a display 201, a VRAM (video RAM) 202, a bit move unit (BMU) 203, a keyboard 204, a pointing device (PD) 205, a CPU 206, a ROM 207, a RAM 208, an HDD 209, a flexible disk drive 210, and a network interface 211. These components are connected to each other by a bus 212.

Note that in the comment management server 103 shown in FIG. 1, the database 111 is stored in the HDD 209, for example, and the CPU 206 functions as the comment manager 110.

In the PC 101A, the display 201 displays e.g. windows, icons, various kinds of messages, menus, and other user interface information. Image data is rendered in the VRAM 202, for displaying images on the display 201. The rendered image data generated in the VRAM 202 is transferred to the display 201 according to a predetermined procedure, and images of the image data are displayed on the display 201.

The bit move unit 203 controls data transfer between memories (e.g. between the VRAM 202 and another memory), and data transfer between a memory and each I/O device (e.g. the network interface 211). The keyboard 204 includes various keys for inputting characters and the like.

The pointing device 205 is used e.g. for indicating icons, menus, and other contents, which are displayed on the display 201, or dragging and dropping displayed objects.

The CPU 206 controls the overall operation of the PC 101A based on an OS (operating system) stored in the ROM 207, the HDD 209, or the flexible disk 210, and control programs, referred to hereinafter. The ROM 207 stores some of the control programs and data.

The RAM 208 is used as a work area for the CPU 206, an area for saving data in error handling, an area for loading the control programs, and so on.

The HDD 209 stores some of the control programs executed by the PC 101A and data. The network interface 211 communicates with the other PC, the comment management server 103, and further a printer (not shown), via the network 104.

The bus 212 includes an address bus, a data bus, and a control bus. Further, the control programs are provided to the CPU 206 from the ROM 207, the HDD 209 or the flexible disk 210, but they may be provided to the CPU 206 from the other PC by way of the network 104 via the network interface 211.

FIG. 3 is a view of an example of a data structure concerning comment management performed by the comment management server 103 shown in FIG. 1.

The example in FIG. 3 illustrates a comment and comment-associated information stored in the database 111 appearing in FIG. 1. The comment-associated information comprises a theme ID, a registration sequence number, and an intervening registration sequence number.

Referring to FIG. 3, a theme ID field 301 is an ID field for managing a comment, in which the same theme ID is set for comments on the same theme. A number indicative of a position of the comment in a sequence of registration of comments is set in a registration sequence number field 302. A number indicative of a position of the comment in a sequence of intervening registration of comments is set in an intervening registration sequence number field 303. The registered comment is set in a comment field 304.

Although in the example illustrated in FIG. 3, a comment is directly managed in the comment field 304, the comment may be formed into a file and a file path may be set in the comment field 304.

Figure 4A:
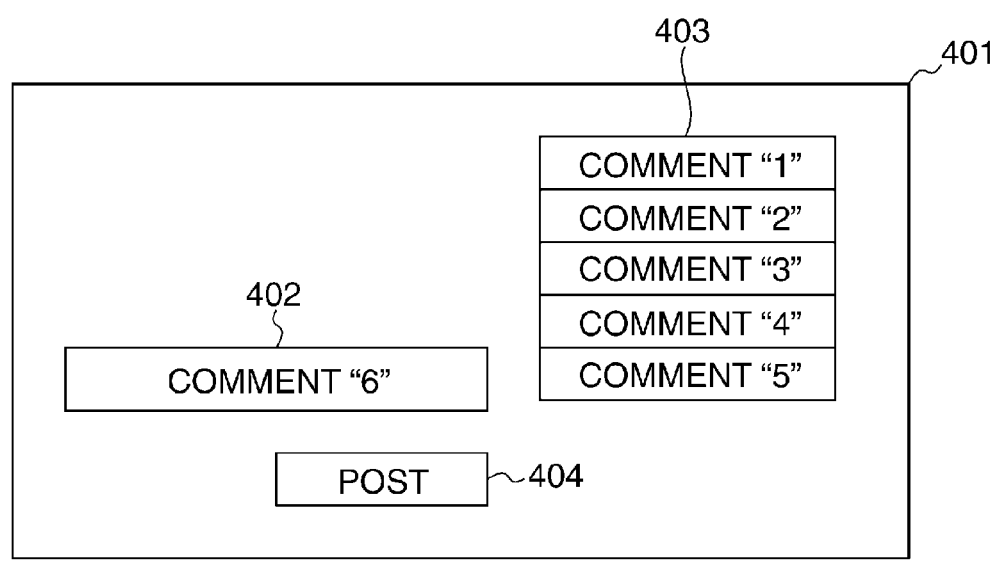
FIG. 4A is a view of a screen displayed on one of the PCs appearing in FIG. 1, which displays a normal comment list and a comment input area.
Figure 4B:
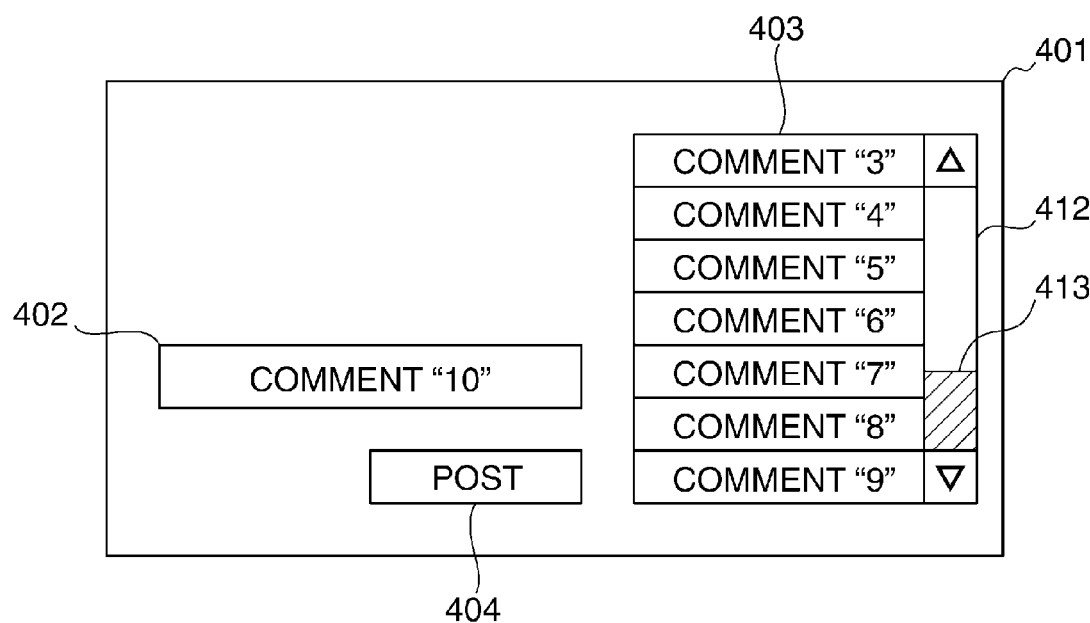
FIG. 4B is a view of a screen displayed on the PC, which displays the comment list in a scrollable manner when there are many comments.
Figure 4C:
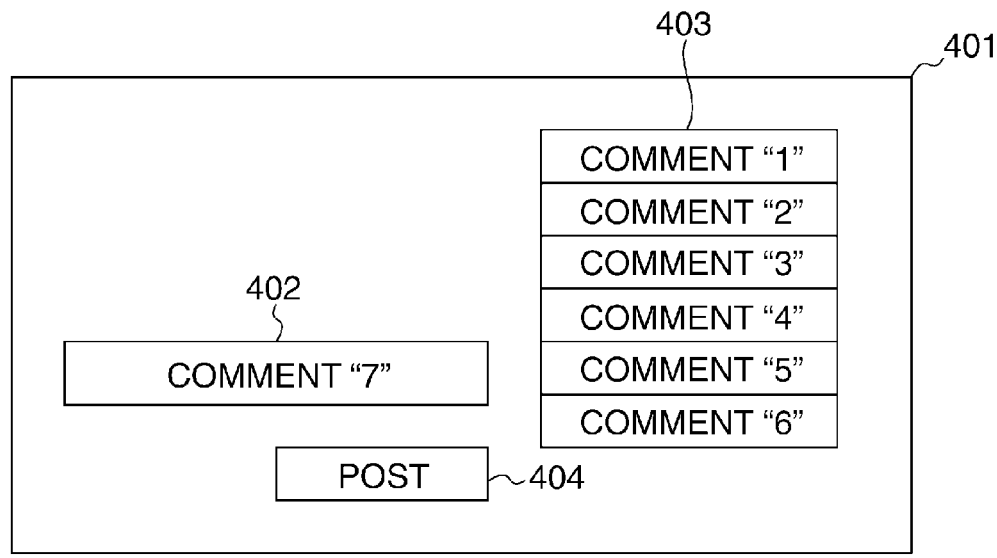
FIG. 4C is a view of a screen displayed on the PC, which displays a state in which processing for posting the comment shown in the comment input area in FIG. 4A has been completed.
Figure 4D:
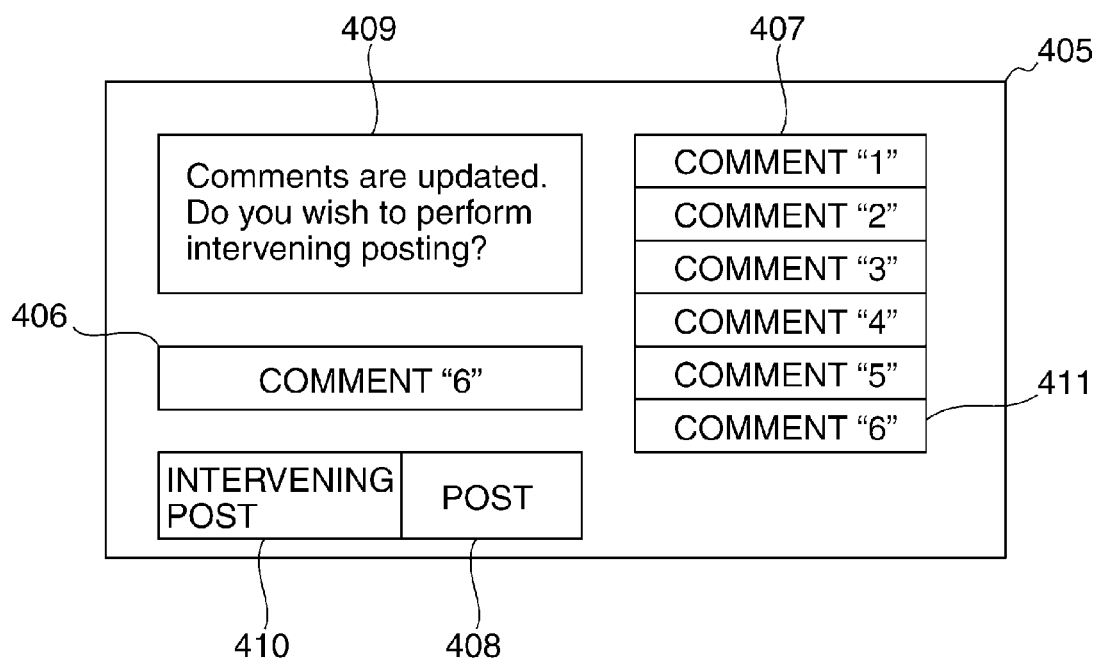
FIG. 4D is a view of a screen displayed on the PC, which displays a notification returned from the comment management server in a case where another user has posted a comment before the processing for posting the comment shown in the comment input area in FIG. 4A has been completed, an updated comment list, and the comment input area.
Figure 4E:
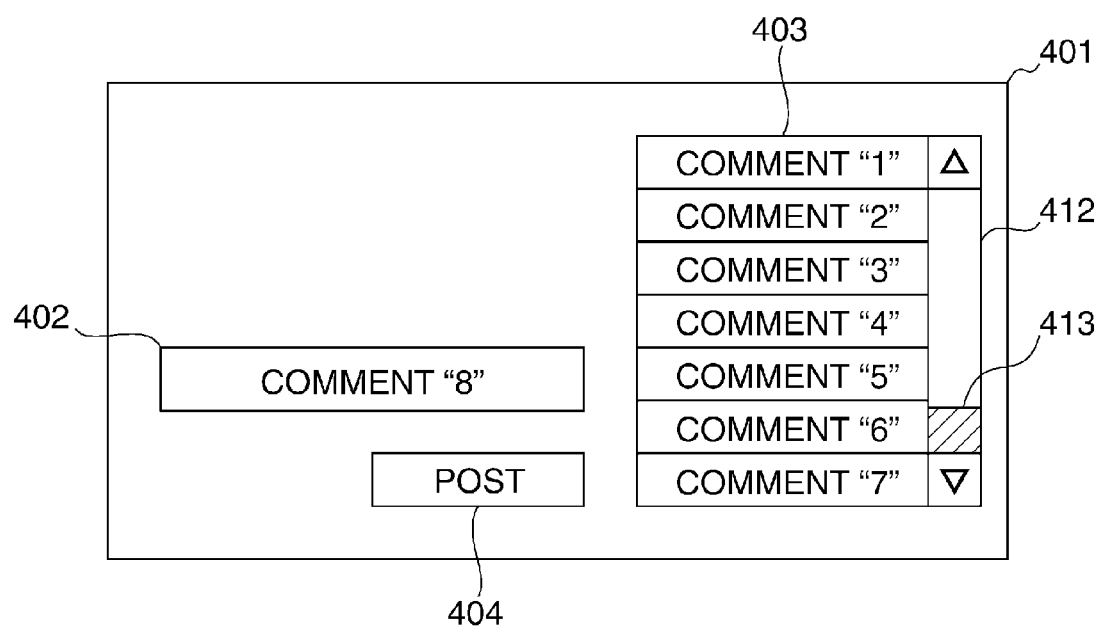
FIG. 4E is a view of a screen displayed on the PC, which displays a state in which processing for posting the comment shown in the comment input area in FIG. 4D has been completed.

FIGS. 4A to 4E are views useful in explaining examples of comment lists and input screens displayed on one of the PCs appearing in FIG. 1, in which FIG. 4A shows a screen which displays a normal comment list and a comment input area, FIG. 4B shows a screen which displays the comment list in a scrollable manner when there are many comments, FIG. 4C shows a screen which displays a state in which processing for posting the comment shown in the comment input area in FIG. 4A has been completed, FIG. 4D shows a screen which displays a notification returned from the comment management server 103 in a case where another user has posted a comment before the processing for posting the comment shown in the comment input area in FIG. 4A has been completed, an updated comment list, and the comment input area, and FIG. 4E shows a screen which displays a state in which processing for posting the comment shown in the comment input area in FIG. 4D has been completed.

Note that the screens displayed on the PC 101A and the PC 101B appearing in FIG. 1 are the same, and hence the following description will be given by referring to the PC 101A.

In the PC 101A, the CPU 206 displays a comment input screen (message input screen) 401 shown in FIG. 4A on the display 201 via the VRAM 202. This comment input screen 401 displays a comment list 403 returned from the comment management server 103 and a comment input area 402.

Further, the comment input screen 401 displays a post button 404. When this post button 404 is clicked, for example, the CPU 206 posts a comment input to the comment input area 402 to the comment management server 103 via the network interface 211.

As shown in FIG. 4B, when there are a large number of comments, it is possible to scroll the comment list 403 using e.g. a scroll bar 412.

FIG. 4C shows a state of the comment input screen 401 in which processing for posting the comment shown in the comment input area 402 in FIG. 4A has been completed. A newly posted comment "6" is displayed in the comment field 304, and a comment next to be posted (comment "7") is displayed in the comment input area 402 in a state in which it can be input to the comment input area 402.

Here, let it be assumed that another user has posted a comments using the PC 101B before the user completes posting of the comment after viewing the comment list 403 using the PC 101A. In this case, the CPU 206 displays a comment input screen 405 shown in FIG. 4D on the display 201 in response to a notification from the comment management server 103.

The screen (re-input screen) 405 displays an updated comment list 407 returned from the comment management server 103 and a comment input area 406. A comment which the user is about to post using the CPU 206 is set and displayed in the comment input area 406. The user is capable of modifying and adding the comment displayed in the comment input area 406. Further, in a notification display area 409, a message (update information) is displayed which notifies that another user has posted a comment before the user completes posting of the comment after viewing the comment list 407 using the PC 101A.

In an example illustrated in FIG. 4D, a comment 411 added from the state of the screen shown in FIG. 4A is displayed in the comment list 407. When there is/are any added comment(s) including the added comment 411, the CPU 206 makes it possible for the user to identify comments posted by other user(s) before the user posts his/her comment after viewing the comment list 403, e.g. by changing the color of the added comments such that the added comments are distinguishable from the other comments.

When the number of the comments in the above-mentioned comment list 407 is so large that the scroll bar 412 for scrolling the comment list 407 is displayed, it is desirable that the CPU 206 displays a knob 413 (see FIG. 4B) of the scroll bar 412 in the vicinity of a position where the comment which the user was about to post would have occupied (position of the comment "6" in the comment list 407 in the illustrated example).

Further, a post button 408 (icon) is displayed on the comment input screen 405. When this post button 408 is clicked, the CPU 206 posts a comment input to the comment input area 406 to the comment management server 103 via the network interface 211, to a position corresponding to a new comment next to all the comments already posted. Further, an intervening post button 410 is displayed on the left side of the post button 408. When this intervening post button 410 is clicked, the CPU 206 performs intervening positing of the comment input to the comment input area 406. More specifically, the CPU 206 adds the comment input to the comment input area 406 to a position corresponding to a comment immediately before the comment posted by the other user before the user completes posting of the comment.

Note that a cancel button may be displayed such that when another user has posted a comment, the CPU 206 displays a warning on the display 201, and deletes existing contents of the comment input area 406.

Figure 5:
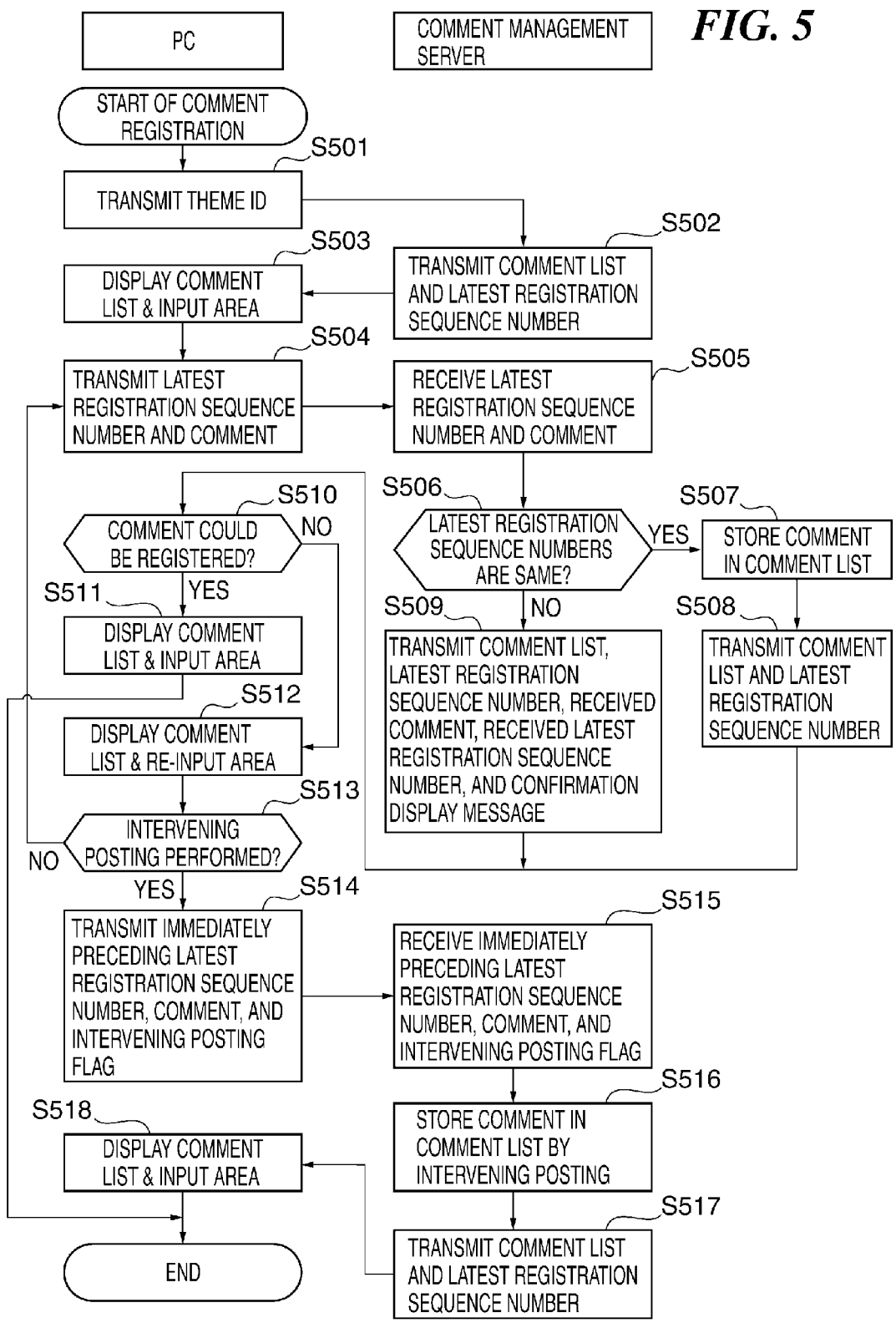
FIG. 5 is a flowchart of a comment registration process performed by the information processing system shown in FIG. 1.

FIG. 5 is a flowchart of a comment registration process performed by the information processing system shown in FIG. 1. The comment registration process in FIG. 5 is executed under the control of the CPU of each PC and the comment management server, and hence steps executed by the CPU of the PC are arranged on the left side, and steps executed by the comment management server are arranged on the right side, as viewed in FIG. 5. Further, the PC 101A and the PC 101B appearing in FIG. 1 performs the same process, and hence comment registration by the PC 101A will be described here.

Now, when the user starts viewing of comments using the PC 101A, the CPU 206 transmits a theme ID associated with the comments being viewed to the comment management server 103 (step S501). In the comment management server 103, the comment manager 110 (i.e. the CPU 206) searches the database 111 based on the received theme ID, and obtains comments under the same theme.

The comment manager 110 refers to the registration sequence number field 302 and the intervening registration sequence number field 303 shown in FIG. 3, associated with each comment obtained by the search, and generates a comment list by arranging the comments based on the registration sequence numbers and the intervening registration sequence numbers of the respective comments. After that, the comment manager 110 returns the comment list (also referred to as the "message list"), and a latest registration sequence number, which is a largest value of the registration sequence numbers of registered comments searched as mentioned above and is notified so as to be returned together with a comment input by the user when the comment is posted, to the PC 101A, as a comment reception notification (step S502).

In the PC 101A, upon receipt of the comment list and the latest registration sequence number (also referred to as the "latest registration sequence number information"), the CPU 206 displays the screen shown in FIG. 4A on the display 201 (step S503). This makes it possible for the user to refer to the comment list to input a comment to the comment input area 402.

In a case where the program 120A operating on the PC 101A is a browser, when the comment manager 110 returns the theme ID in the step S501, if the comment manager 110 uses HTML (Hyper Text Markup Language) or Java (registered trademark) script, it is possible to control the comment list and the notified latest registration sequence number, using the comment management server 103.

Further, in the above-described step S502, the comment list is generated by arranging the comments using the registration sequence numbers and the intervening registration sequence numbers of the respective comments. However, for example, when the comments include another element, such as a registrant name, as comment-associated information, or when an instruction concerning display, such as an instruction for disabling display of intervening comments, is given, the comments may be arranged according to the other element or the instruction.

Subsequently, in the PC 101A, the CPU 206 transmits the comments input to the comment input area 402 shown in FIG. 4A, and the latest registration sequence number of the comment obtained in the step S502 to the comment management server 103, to thereby make a comment posting request (Step S504).

In the comment management server 103, the comment manager 110 receives the posted comment and the latest registration sequence number of the comment (the latest registration sequence number is the latest registration sequence number returned in the above-described step S502) (step S505).

Then, the comment manager 110 obtains a latest registration sequence number (largest value of the registration sequence numbers of the registered comments obtained by a new search) by referring to the data stored in the database 111 (see FIG. 3), and compares the latest registration sequence number received in the step S505 (largest value of the registration sequence numbers of the registered comments obtained by the search in the step S502), and the latest registration sequence number obtained by the new search of the database 111, to thereby determine whether or not they are the same (step S506).

If the latest registration sequence number received in the step S505 and the latest registration sequence number obtained by the new search of the database 111 are the same (YES to the step S506), the comment manager 110 determines that no comment has been posted by any other user, and generates data including the received comment (see FIG. 3). Then, the comment manager 110 stores a comment list (also referred to as the "message list") formed in the database 111, and the generated data (step S507).

At this time, the comment manager 110 sets the registration sequence number of the comment newly registered (stored) in the registration sequence number field 302, to a value which is calculated by adding 1 to the largest value of the registration sequence numbers of the registered comments. Further, since the comment is not posted by intervening posting, a registration sequence number stored in the intervening registration sequence number field 303 is set to 0.

As described above, whenever a comment is registered, the registration sequence number stored in the registration sequence number field 302 is set to a value larger by 1 than the largest value of the registration sequence numbers of already registered comments, whereby in the step S506, the comment manager 110 can determine whether or not a new comment has been added by any other user.

Then, the comment manager 110 generates a list of comments associated with the theme ID according to data stored in the database 111 as described above. In doing this, the comment manager 110 arranges the order of comments by referring to the registration sequence number and intervening registration sequence number stored respectively in the registration sequence number field 302 and the intervening registration sequence number field 303 of the comment-associated information of each comment, and returns the thus generated comment list and the latest registration sequence number of the comment (which servers as registration notification) to the PC 101A (step S508).

On the other hand, if the latest registration sequence number received in the step S505 and the latest registration sequence number obtained by the new search of the database 111 are different (NO to the step S506), the comment manager 110 generates a new comment list of comments associated with the theme ID according to the data stored in the database 111. In this case, the comment manager 110 arranges the order of comments by referring to the registration sequence number and the intervening registration sequence number stored respectively in the registration sequence number field 302 and the intervening registration sequence number field 303 of the comment-associated information of each comment and returns a thus generated comment list and the latest registration sequence number (largest value of the registration sequence numbers of the registered comments) to the PC 101A (step S509).

Further, the comment manager 110 transmits the comment received in the step S505 (hereinafter referred to as the "immediately preceding comment"), the latest registration sequence number therefor (hereinafter referred to as the "immediately preceding latest registration sequence number"), and a confirmation display message (confirmation notification) to the PC 101A.

In the PC 101A, the CPU 206 checks the information (the comment and the latest registration sequence number) returned from the comment management server 103, and checks whether or not the comment could be registered (step S510).

In the step S510, when the immediately preceding comment and the immediately preceding latest registration sequence number are not received, that is, when only the comment list and the latest registration sequence number are received, the CPU 206 determines that the registration of the comment has been performed (registered). On the other hand, when the immediately preceding comment and the immediately preceding latest registration sequence number are received, the CPU 206 determines that the comment has not been registered.

If it is determined that the registration of the comment has been performed (YES to the step S510), the CPU 206 displays on the display 201 a screen an example of which is shown in FIG. 4C (step S511), and terminates the present process.

On the other hand, if it is determined that the comment is not registered (NO to the step S510), the CPU 206 displays on the display 201 a screen an example of which is shown in FIG. 4D (step S512). At this time, the CPU 206 sets the immediately preceding comment returned from the comment manager 110 in the comment input area 406. Therefore, in this case, comments (comment "6") associated with the same registration sequence number appear in the comment list 407 and the comment input area 406, but it is to be understood that they are different in contents.

Then, the CPU 206 checks whether or not an operation for intervening posting has been performed on the screen shown in FIG. 4D (step S513). Here, when the user has operated the post button 408, the CPU 206 determines that normal comment posting has been performed, whereas when the user has operated the intervening post button 410, the CPU 206 determines that intervening comment posting has been performed.

If an operation for intervening posting has not been performed (NO to the step S513), i.e. if the post button 408 is operated, and it is determined that new comment posting has been performed, the CPU 206 returns to the step S504, and returns the comment and the latest registration sequence number to the comment management server 103. Here, the CPU 206 transmits the comment input to the comment input area 406 and the latest registration sequence number newly returned from the comment management server 103, to the comment management server 103, to thereby make a comment posting request.

If an operation for intervening posting has been performed (YES to the step S513), i.e. if the intervening post button 410 is operated, and it is determined that reposting has been performed, the CPU 206 transmits the comment input to the comment input area 406, the immediately preceding latest registration sequence number returned from the comment management server 103, and the intervening posting flag to the comment management server 103, to thereby make a comment posting request (step S514).

In the comment management server 103, the comment manager 110 receives the comment, the immediately preceding latest registration sequence number, and the intervening posting flag from the PC 101A (step S515). When the intervening posting flag exists, the comment manager 110 determines that the transmission from the PC 101A is performed for intervening posting, and generates data including the received comment (see FIG. 3) to store the data in the comment list of the database 111 (step S516).

At this time, the comment manager 110 sets the registration sequence number stored in the registration sequence number field 302 to a value which is larger by 1 than the immediately preceding latest registration sequence number received in the step S515. Further, the comment manager 110 sets the intervening registration sequence number stored in the intervening registration sequence number field 303 to a value which is larger by 1 than the largest value of the intervening registration sequence numbers already registered. In the illustrated example, since the comment is first in the intervening order, the intervening registration sequence number is set to 1 which is larger by 1 than 0.

This makes it possible to cause a comment to intervene between comments displayed in the comment list. For example, in the comment list 407 illustrated in FIG. 4D, a newly posted comment "6" is posted in a manner intervening between the comment "5" and the comment "6". At this time, the registration sequence number of the comment preceding registered as the comment "6" in the comment list 407 is corrected to "7", and comments posted thereafter, if any, are also registered again after the sequential registration sequence numbers thereof are corrected to respective numbers each incremented by 1.

Then, the comment manager 110 generates a list of comments concerning the theme ID based on the data stored in the database 111, similarly to the step S502. At this time, the comment manager 110 arranges the order of comments by referring to the registration sequence number and the intervening registration sequence number stored respectively in the registration sequence number field 302 and the intervening registration sequence number field 303 of the comment-associated information of each comment and returns a thus generated comment list and a latest registration sequence number to the PC 101A (step S517).

Upon receipt of the comment list and the latest registration sequence number, the CPU 206 displays a screen shown in FIG. 4E on the display 201 (step S518), followed by terminating the present process.

As described above, in the first embodiment of the present invention, before a user registers a comment after a comment list is displayed on the PC 101A or the PC 101B, when another user has registered a comment on the same theme, the user can post the comment e.g. by modifying his comment after checking the comment registered by the other user. At this time, if intervening posting is employed, it is possible to prevent the comment from becoming irrelevant to a comment immediately preceding in the order of display.

As described heretofore, in the first embodiment of the present invention, when a comment is input, it is possible to post an appropriate comment by referring to any other comments posted slightly earlier.

Next, a description will be given of an example of an information processing system including information processing apparatuses and a server apparatus, according to a second embodiment of the present invention. Note that the configuration of the information processing system according to the second embodiment is the same as shown in FIG. 1, and the hardware configuration of each PC and the hardware configuration of the comment management server are the same as shown in FIG. 2.

Referring to FIG. 1, in the information processing according to the second embodiment, when the comment management server 103 receives a theme (i.e. a theme ID) e.g. from the PC 101A, the comment manager 110 refers to the database 111, and transmits comments stored therein in association with the notified theme to the PC 101A.

In the PC 101A, the CPU 206 displays the comments returned from the comment management server 103 on the display 201. Then, when the CPU 206 gives an instruction for inputting a comment, the CPU 206 notifies the comment management server 103 of the start of inputting the comment. Upon receipt of the notification, the comment manager 110 generates an input token, described hereinafter, by referring to the database 111, and transmits the input token to the PC 101A.

On the other hand, in the PC 101A, when the user terminates the input of the comment, and gives an instruction for posting the comment, the CPU 206 transmits the input token and the comment to the comment management server 103. In the comment management server 103, the comment manager 110 stores the received input token and comment in the database 111, as described hereinafter.

Before the user posts the comment after starting to input the same, if another user gives an instruction for inputting a comment using the PC 101B, the CPU 206 notifies the comment management server 103 of the start of inputting this comment. At this time, since the input token has already been issued, the comment manager 110 returns no input token. In the PC 101B, when no input token is returned, the PC 101B displays on the display 201 a message to the effect that an input of a comment is restricted.

As described above, since an input of a comment by another user is restricted until the user terminates posting of his comment after starting to input the same, it is not only possible to prevent the comment posted by the user from having contents similar to the contents of the comment posted by the other user but also to prevent the contents of the comment posted by the user from being irrelevant to the contents of a comment immediately preceding in the order of display which has been posted by the other user.

FIGS. 6A to 6C are views of examples of data structures concerning comment management performed by the comment management server according to the second embodiment, in which FIG. 6A shows an example of a data structure concerning the comment management, FIG. 6B shows an example of a data structure for managing provisional registration of a comment, and FIG. 6C shows an example of a data structure for managing an input token.

Referring to FIG. 6A, a theme ID for managing a comment is stored in a theme ID field 601. The same theme ID is set for comments concerning the same theme. A number indicative of a position of the comment in a sequence of provisional registration of comments is set in a registration sequence number field 602. The registered comment is set in a comment field 603.

Referring to FIG. 6B, a theme ID for managing a comment is set in a theme ID field 604. A number indicative of a position of the comment in a sequence of registration of comments assuming that registration of the comment is performed is set in a registration sequence number field 605. The date and time of an acquisition attempt of an input token is set as a token acquisition date and time in a token acquisition date and time field 606. The comment subjected to provisional registration is set in a comment field 607.

Referring to FIG. 6C, a theme ID concerning a theme for which the input token has been issued is set in a theme ID field 608. The date and time at which the input token was issued (token issue date and time) is set in an issue date and time field 609. The issued input token is set in an input token field 610. Data items shown in FIGS. 6A to 6C are stored in the database 111.

Figure 7:
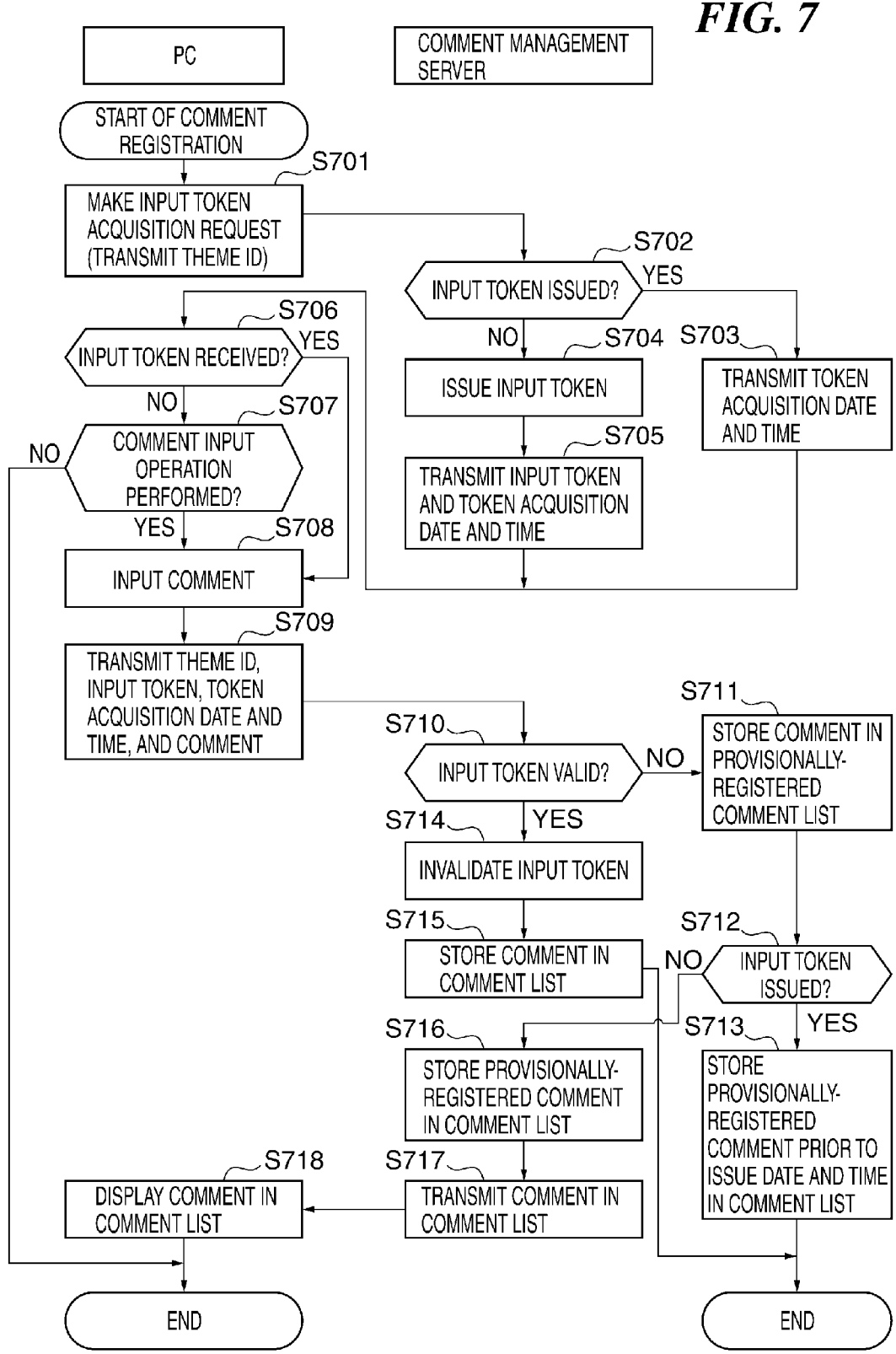
FIG. 7 is a flowchart of a comment registration process performed by an information processing system according to the second embodiment.

FIG. 7 is a flowchart of a comment registration process performed by the information processing system according to the second embodiment.

Now, let it be assumed that the user is viewing comments concerning a user's desired theme using the PC 101A. The user is about to post a comment on the theme.

Note that for an input of a comment, the CPU 206 displays a comment input screen on the display 201. A post button and a comment input area are displayed on this comment input screen. Display of the comment input screen is performed according to an instruction from the user. When the user instruction is given, the CPU 206 determines that the input of the comment is started. Note that the CPU 206 may determine that the input of the comment is started when characters are input to the comment input area.

When it is determined that an input of a comment is started, the CPU 206 transmits a theme ID defining the theme of comments which the user is viewing, to the comment management server 103 to thereby make an input token acquisition request (step S701).

Upon receipt of the theme ID, the comment manager 110 checks whether or not the input token has been issued, according to the theme ID (step S702). When executing the step S702, the comment manager 110 refers to data (see FIG. 6C) for managing input tokens stored in the database 111. More specifically, the comment manager 110 searches the theme ID field 608 associated with the received theme ID, and if the input token is not included in the input token field 610 associated with the received theme ID, determines that the input token has not been issued.

Further, even when the input token is included in the input token field 610 associated with the received theme ID, if a predetermined time period has elapsed from a token issue date and time stored in the issue date and time field 609, the comment manager 110 regards the input token as invalid and determines that an input token associated with the received theme ID has not been issued yet.

When the input token exits and is valid, it can be determined that the PC 101B, for example, other than the PC 101A has already acquired the input token, and hence one of the other users who are viewing the comments is inputting a comment on his screen.

If the input token has been issued, (YES to the step S702), the comment manager 110 transmits to the PC 101A only the token acquisition date and time (however, in this case, actually, the input token has not be acquired, and hence it is the date and time of an acquisition attempt of the input token) without returning the input token (step S703).

If the input token has not been issued yet (NO to the step S702), the comment manager 110 issues an input token in association with the received theme ID, and generates the data shown in FIG. 6C. Then, the comment manager 110 stores the data in the database 111 (step S704). Next, the comment manager 110 returns the issued input token and the token acquisition date and time (in this case, it is the same as the token issue date and time of the issued input token) to the PC 101A (step S705).

In the PC 101A, the CPU 206 confirms whether the input token has been received (step S706). If it is impossible to confirm that the input token has been received (NO to the step S706), i.e., if the input token has not been returned from the comment management server 103, the CPU 206 notifies the user that some other user is inputting a comment and the input comment cannot be posted at a position next to the comments in the comment list the user is viewing now, e.g. by displaying the notification on the display 201. Then, the CPU 206 checks for an input of the comment (step S707).

That is, in response to the above-described notification, the user determines whether to continue or cancel the input of the comment. When the input of the comment is cancelled (NO to the step S707), the CPU 206 terminates the present process.

Note that the CPU 206 may perform only the above notification and cause the input of the comment to be canceled without allowing the user to continue the same. In this case, comment input operations on the same theme cannot be simultaneously performed by a plurality of users. Further, when notifying the user whether to continue or cancel the input of the comment, the CPU 206 may set a time limit to time over which it waits for an input of the comment, and display the time limit on the display 201.

On the other hand, if the input of the comment is continued (YES to the step S707), the CPU 206 receives the input of the comment from the user (step S708). Note that if receipt of the input token can be confirmed in the step S706 (YES to the step S706), i.e. if the input token has been returned from the comment management server 103, the CPU 206 directly proceeds to the step S708 to receive the input of the comment from the user.

Next, the CPU 206 transmits the theme ID used for acquiring the input token, the acquired input token, the token acquisition date and time, and the input comment, to the comment management server 103, to thereby make a comment posting request (step S709).

Note that if the user has continued the input of the comment in the step S707, this is a case where the input token has not been returned from the comment management server 103, so that the CPU 206 transmits the theme ID, the token acquisition date and time, and the input comment, without the input token.

Then, in the comment management server 103, the comment manager 110 checks the validity of the input token according to the received theme ID and input token (step S710). In the step S710, the comment manager 110 refers to the data for managing the input token, stored in the database 111, and searches for data associated with the theme ID and the input token. Then, when the data associated with the theme ID and the input token exists, and time elapsed after the token issue date and time stored in the issue date and time field 609 does not exceed a predetermined time period (i.e. within a predetermined time period), the comment manager 110 determines that the input token is valid.

Note that if the user has continued the input of the comment in the step S707, the input token has not been received, which makes it impossible to search for data associated with the theme ID and the input token, so that the comment manager 110 determines that the input token is invalid.

If the validity of the input token cannot be confirmed (NO to the step S710), i.e. if the input token is invalid, the comment manager 110 stores the received comment in the database 111 as data of a provisionally-registered comment list (provisionally-registered message) shown in FIG. 6B, in association with the received theme ID and token acquisition date and time (step S711). Then, the comment manager 110 checks, based on the theme ID, whether or not the input token has been issued, by the same method employed in the step S702 described hereinabove (step S712).

If it is possible to confirm that the input token has been issued (YES to the step S712), i.e. if the input token has already been issued, the comment manager 110 compares the token issue date and time stored in the issue date and time field 609 associated with the issued input token, and the token acquisition date and time stored in the token acquisition date and time field 606. Then, the comment manager 110 stores a comment provisionally registered in association with the token acquisition date and time before the token issue date and time of the issued input token, in the database 111, as data in the comment list shown in FIG. 6A, based on the registration sequence number stored in the registration sequence number field 605 (step S713). Then, the comment manager 110 terminates the present process.

By doing this, even in a case where the input token is continuously acquired by other users (PCs) or in a case where the input token acquired by the user is invalidated due to timeout and then acquired by another user (PC), it is possible to cause the provisionally-registered comment to be reflected on the comment list.

If the validity of the input token is confirmed (YES to the step S710), i.e. if the input token is valid, the comment manager 110 deletes and invalidates the data associated with the input token (step S714). Then, the comment manager 110 stores the received comment in the database 111 as data in the comment list shown in FIG. 6A in association with the received theme ID (step S715), followed by terminating the present process.

If it is impossible to confirm that the input token has been issued (NO to the step S712), i.e. if the input token has not been issued yet, the comment manager 110 stores the provisionally-registered comment in the database 111 as data in the comment list shown in FIG. 6A, based on the registration sequence number stored in the registration sequence number field 605 (step S716). Then, the comment manager 110 transmits the data in the comment list shown in FIG. 6A, which is associated with the received theme ID, to the PC 101A (step S717).

In the PC 101A, the CPU 206 displays the comment list on the display 201 according to the comment list data (step S718), followed by terminating the present process.

As described above, when the input token has not been issued yet, the processing described in the step S716 is executed, whereby even when a user who acquired an input token to input a comment has cancelled the input of the comment or timeout has occurred, it is possible to perform the comment registration process without performing provisional registration of the comment input by the user who has continued the input of the comment in the step S707.

Note that after a comment has posted, if the comment is subjected to provisional registration, a rough indication of a time period taken before the comment is displayed may be displayed together with the comment list.

Figure 8:
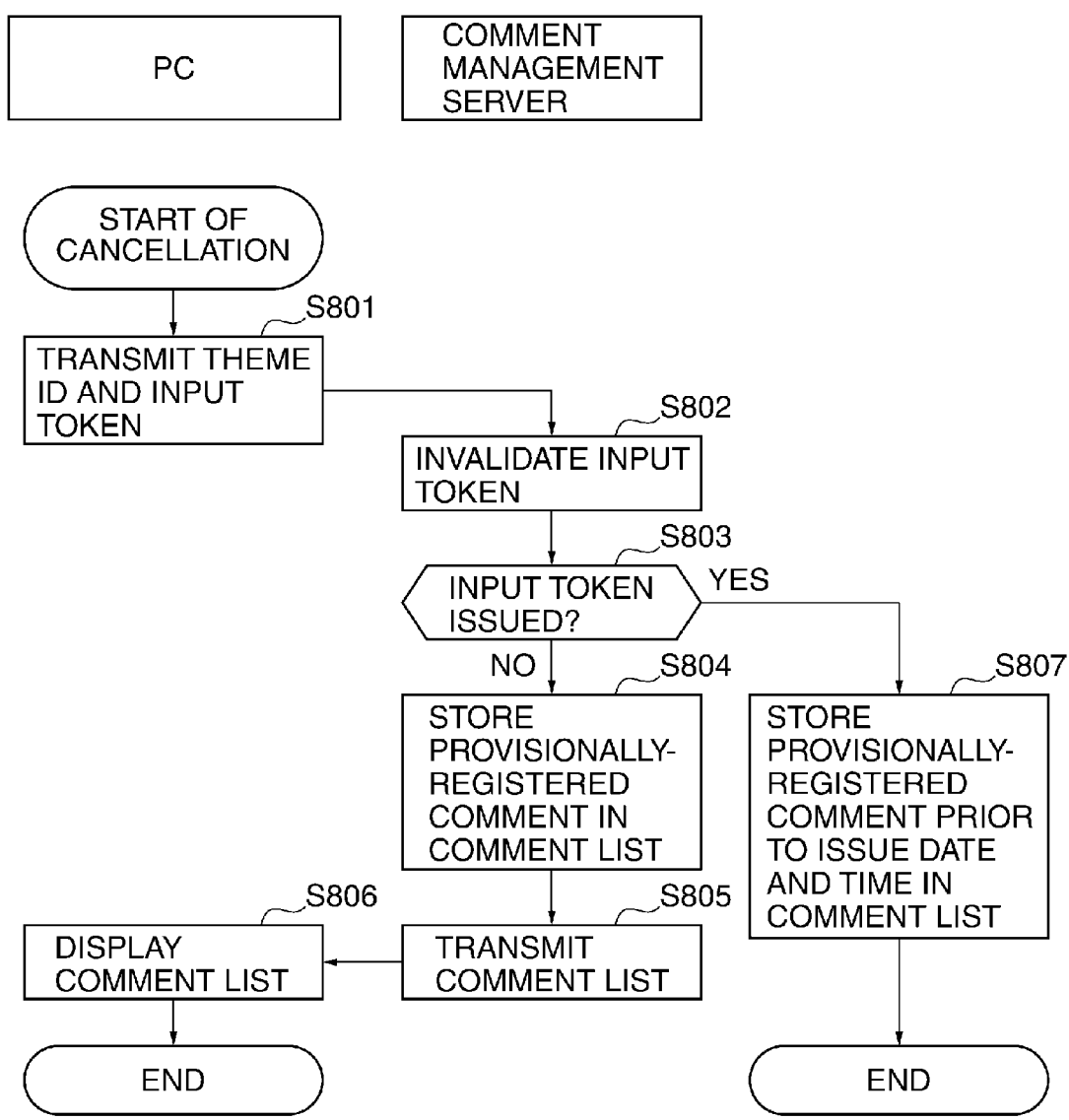
FIG. 8 is a flowchart of a comment input cancellation process performed by the information processing system according to the second embodiment.

FIG. 8 is a flowchart of a comment input cancellation process performed by the information processing system according to the second embodiment.

Now, let it be assumed that the user performs an operation for canceling the input of the comment using the PC 101A. To perform this cancel operation, a cancel button, for example, is provided on a screen displayed on the display 201, and when an input area is caused to disappear by operating the cancel button, the CPU 206 determines that the cancel operation has been performed. Note that the CPU 206 may determine that the cancel operation has been performed when the screen shifts to another page by a user operation.

When it is determined that the cancel operation has been performed, the CPU 206 transmits the theme ID used to acquire the input token and the input token to the comment management server 103, to thereby make a comment input cancel request (cancel notification) (step S801).

Note that if the user has continued the input of the comment in the step S707 of the comment registration process described with reference to FIG. 7, the input token is not returned from the comment management server 103, so that it is not necessary to perform this comment input cancellation process.

In the comment management server 103, the comment manager 110 deletes and invalidates data associated with the input token according to the received theme ID and input token (step S802). Here, there is a case where the data associated with the input token has already been invalidated in a timeout process described hereinafter, and hence the deletion of the data is not performed when there is no data associated with the received theme ID and input token.

Then, the comment manager 110 checks, based on the received theme ID, whether or not the input token has been issued, by the same method employed in the step S702 of the comment registration process described with reference to FIG. 7 (step S803). As a result of the check, if it is impossible to confirm that the input token has been issued (NO to the step S803), i.e. if the input token has not been issued yet, the comment manager 110 performs storage processing for storing the provisionally-registered comment in the database 111 as data in the comment list shown in FIG. 6A, based on the registration sequence number stored in the registration sequence number field 605 of data of the provisionally-registered comment list shown in FIG. 6B (step S804).

By doing this, it is possible to cause the comment provisionally registered during issue of the input token to be reflected on the comment list.

Then, in the comment management server 103, the comment manager 110 transmits the data of the comment list shown in FIG. 6A, which is associated with the received theme ID, to the PC 101A (step S805). In the PC 101A, the CPU 206 displays the comment list on the display 201 according to the comment list data (step S806), followed by terminating the present process.

If it is possible to confirm that the input token has been issued (YES to the step S803), i.e. if the input token has already been issued, the comment manager 110 compares the token issue date and time stored in the issue date and time field 609 associated with the issued input token, and the token acquisition date and time stored in the token acquisition date and time field 606. Then, the comment manager 110 stores a comment provisionally registered in association with the token acquisition date and time before the token issue date and time of the issued input token, in the database 111, as data in the comment list shown in FIG. 6A, according to the registration sequence number stored in the registration sequence number field 605 (step S807). After that, the comment manager 110 terminates the present process.

By doing this, in a case where a predetermined time period has elapsed after issue of an input token for which the comment input cancellation process is being performed, and hence in the step S702 of the comment registration process described with reference to FIG. 7, it is determined that the issued input token is invalid, i.e. the input token has not been issued yet, it is possible to cause the comment provisionally registered during issue of the input token to be reflected on the comment list.

Figure 9:
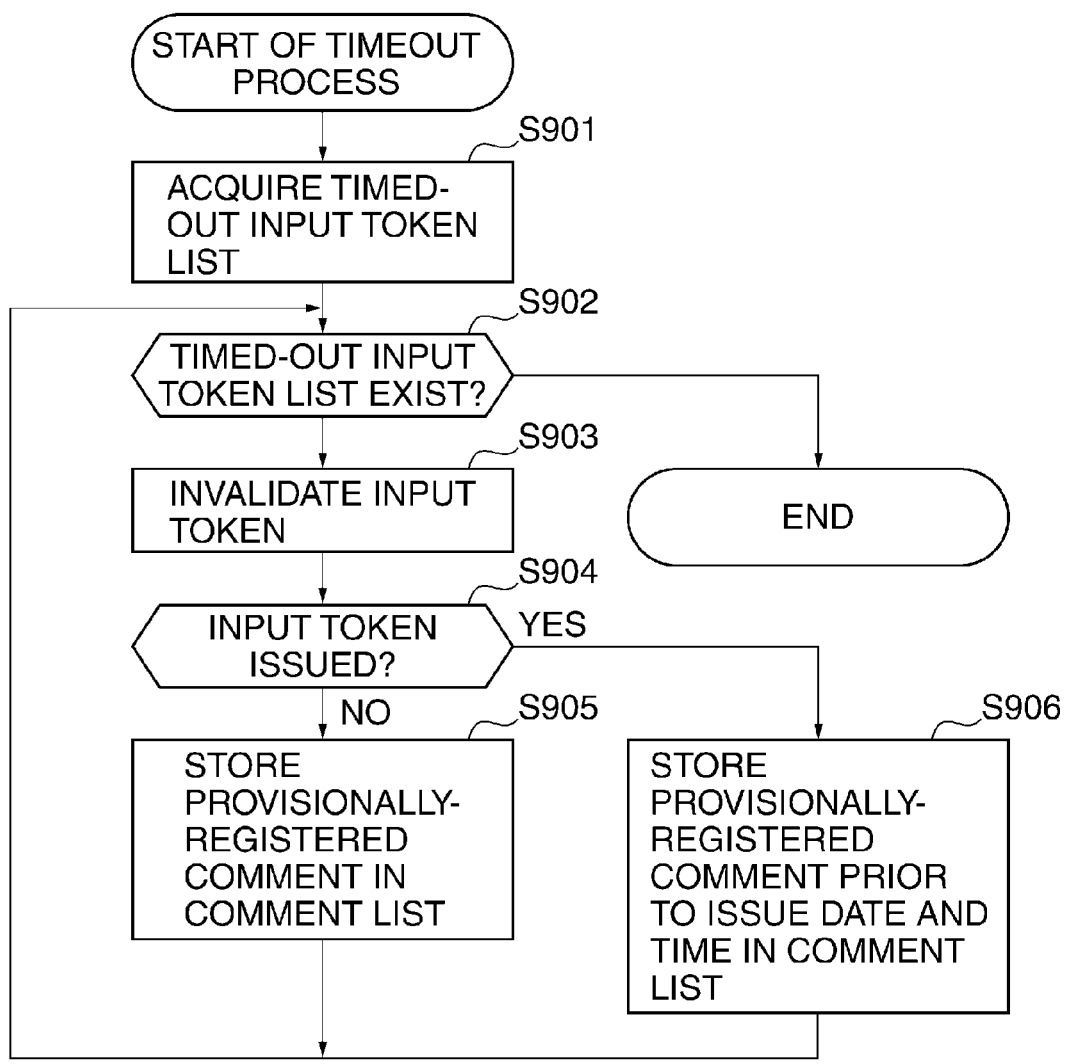
FIG. 9 is a flowchart of a comment registration timeout process performed by the comment management server according to the second embodiment.

FIG. 9 is a flowchart of a comment registration timeout process performed by the comment management server according to the second embodiment. This comment registration timeout process is periodically executed by the comment management server 103 using a timer or the like.

When the comment registration timeout process is started, the comment manager 110 acquires a timed-out input token list (step S901). The timed-out input token list is a list in which are sequentially entered input tokens each associated with a token issue date and time in the issue date and time field 609 stored in the database 111 (see FIG. 6C) from which a predetermined time period has elapsed.

Next, the comment manager 110 determines whether or not there is any timed-out input token in the timed-out input token list (step S902).

If there is no timed-out input token in the timed-out input token list (NO to the step S902), i.e. if the acquired timed-out input token list does not contain any timed-out input token from the beginning, or if all timed-out input tokens entered in the list have been taken out and deleted after completion of processing thereof, the comment manager 110 terminates the comment registration timeout process.

If there is any unprocessed timed-out input token in the timed-out input token list (YES to the step S902), the comment manager 110 deletes data associated with the timed-out input token to thereby invalidate the input token (step S903). In doing this, before deleting the data associated with the timed-out input token, the comment manager 110 acquires the theme ID from the theme ID field 608 associated with the timed-out input token.

Then, the comment manager 110 checks whether or not the input token has been issued, based on the theme ID associated with the timed-out input token invalidated, by the same method as employed in the step S702 of the comment registration process described with reference to FIG. 7 (step S904). If it is impossible to confirm that the input token has been issued (NO to the step S904), i.e. if the input token has not been issued yet, the comment manager 110 stores the provisionally-registered comment in the database 111 as data in the comment list shown in FIG. 6A, according to the registration sequence number stored in the registration sequence number field 605 (step S905).

By doing this, the comment manager 110 causes the comment provisionally registered during issue of the input token to be reflected on the comment list, and returns to the step S902.

If it is possible to confirm that the input token has been issued (YES to the step S904), i.e. if the input token has already been issued, the comment manager 110 compares the token issue date and time stored in the issue date and time field 609 associated with the issued input token, and the token acquisition date and time stored in the token acquisition date and time field 606. Then, the comment manager 110 stores a comment provisionally registered in association with the token acquisition date and time before the token issue date and time of the issued input token, in the database 111, as data in the comment list shown in FIG. 6A, according to the registration sequence number stored in the registration sequence number field 605 (step S906). After that, the comment manager 110 returns to the step S902.

By doing this, even in a case where an input token is subjected to the timeout process to be invalidated due to the lapse of a predetermined time period from the token issue date and time thereof, and it is determined in the step S702 of the comment registration process described with reference to FIG. 7 that an associated input token has not been issued yet, it is possible to cause the comment provisionally registered during issue of the input token to be reflected on the comment list.

As described heretofore, in the embodiment of the present invention, if one user has started to input a comment earlier, posting of a comment by another user is restricted, so that it is possible not only to prevent comments posted by the users from having similar contents but also to prevent the contents of comments posted by the users from being irrelevant to each other.

As is clear from the above description, in the examples illustrated in FIGS. 1 and 2, the comment manager 110 functions as a generation unit, a transmission unit, and a storage unit. Further, the comment manager 110 functions as a notification unit, a checking unit, and an invalidating unit. Furthermore, in the PC 101A or the PC 101B, the CPU 206 functions as a display control unit and a determination unit.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-142592 filed Jul. 8, 2013 which is hereby incorporated by reference herein in its entirety.

What is claimed is:

1. A server apparatus that is connected to at least one information processing apparatus via a network, for receiving a message posted from the information processing apparatus to make the message open to the public, comprising:
a generation unit configured to, whenever receiving a posting request for posting a message from the information processing apparatus, generate a posting reception notification which indicates information related to a reception sequence number of the posting request; a transmission unit configured to transmit the posting reception notification to the information processing apparatus;
a storage unit configured to receive not only the message posted from the information processing apparatus but also the posting reception notification as reception information, and store the message in a memory if there is no posting request from another information processing apparatus which has been made with a reception sequence number later in sequential order than the reception sequence number indicated by the information related to the reception sequence number indicated by the reception information; and
a notification unit,
wherein whenever said generation unit receives the posting request from the information processing apparatus, said generation unit generates latest registration sequence number information indicating that the posting request is a latest posting request at a current time, as the posting reception notification,
wherein said storage unit stores the message in the memory, when a registration sequence number as the reception sequence number indicated by the information related to the reception sequence number indicated by the reception information matches the latest registration sequence number, and
wherein said notification unit is configured to, when the registration sequence number indicated by the reception information matches the latest registration sequence number, transmit a registration notification to the effect that the message has been registered, to the information processing apparatus, whereas when the registration sequence number indicated by the reception information does not match the latest registration sequence number, said notification unit transmits a confirmation notification to the effect that there is a latest message other than the message of which the posting request has been made by the information processing apparatus, to the information processing apparatus.

2. The server apparatus according to claim 1, wherein when an intervening posting request has been made by the information processing apparatus in response to the confirmation notification, said storage unit stores the message in the memory.

3. The server apparatus according to claim 1, wherein when said storage unit stores the message in the memory, said storage unit stores the message, in association with a theme ID indicative of a theme to which the message belongs, and the registration sequence number of the message.

4. The server apparatus according to claim 3, wherein when said transmission unit transmits the posting reception notification, said transmission unit transmits a list of messages which are given the same theme ID, to the information processing apparatus, as a message list.

5. The server apparatus according to claim 4, wherein upon receipt of the theme ID from the information processing apparatus as the posting request, said transmission unit transmits the posting reception notification and the message list to the information processing apparatus.

6. The server apparatus according to claim 1, wherein whenever receiving the posting request from the information processing apparatus, said generation unit generates a token for inputting the message and an issue date and time of the token, as the posting reception notification, and wherein upon receipt of the reception information, if a time period which has elapsed from the issue date and time indicated by the reception information is not longer than a predetermined time period, said storage unit stores the message in the memory as a message in a message list.

7. The server apparatus according to claim 6, wherein before the token is invalidated after having been issued to the information processing apparatus, even when the posting request has been received from another information processing apparatus, said generation unit does not issue the token.

8. The server apparatus according to claim 7, wherein when said storage unit stores the message in the memory as the message in the message list, said storage unit invalidates the token.

9. The server apparatus according to claim 1, wherein when a time period which has elapsed from the issue date and time indicated by the reception information becomes longer than a predetermined time period, said storage unit stores the message in the memory as a provisionally-registered message.

10. The server apparatus according to claim 9, further comprising a checking unit configured to, when the provisionally-registered message is stored, check whether or not the token related to the provisionally-registered message has been issued, wherein when said checking unit checks to find that the token has not been issued, said storage unit stores the provisionally-registered message in the memory as a message in a message list, and wherein said transmission unit transmits the message list to the information processing apparatus.

11. The server apparatus according to claim 10, wherein when said checking unit checks to find that the token has been issued, said storage unit stores only the provisionally-registered message prior to the issue date and time of the token, in the memory, as the message in the message list.

12. The server apparatus according to claim 11, further comprising an invalidating unit configured to, upon receipt of a cancel notification to the effect that storage of a message is canceled from the information processing apparatus, invalidate the token if the token has been issued, and wherein in a case where the provisionally-registered message exists when the cancel notification to the effect that storage of the message is canceled is received from the information processing apparatus, said storage unit performs processing for storing the provisionally-registered message depending on a result of the check by said checking unit.

13. An information processing apparatus connected to a server apparatus via a network, wherein the server apparatus receives a message posted from the information processing apparatus, for making the message open to the public, and includes:

a generation unit configured to, whenever receiving a posting request for posting a message from the information processing apparatus, generate a posting reception notification which indicates information related to a reception sequence number of the posting request, a transmission unit configured to transmit the posting reception notification to the information processing apparatus;

a storage unit configured to receive not only the message posted from the information processing apparatus but also the posting reception notification as reception information, and store the message in a memory if there is no posting request from another information processing apparatus which has been made with a reception sequence number later in sequential order than the reception sequence number indicated by the information related to the reception sequence number indicated by the reception information; and a notification unit;

the information processing apparatus comprising a display control unit configured to, upon receipt of the transmission reception notification from the server apparatus, display a message input screen for inputting the message, on a display section, wherein whenever said generation unit of the server apparatus receives the posting request from the information processing apparatus, said generation unit of the server apparatus generates latest registration sequence number information indicating that the posting request is a latest posting request at a current time, as the posting reception notification, wherein said storage unit of the server apparatus stores the message in the memory, when a registration sequence number as the reception sequence number indicated by the information related to the reception sequence number indicated by the reception information matches the latest registration sequence number, wherein said notification unit of the server apparatus, when the registration sequence number indicated by the reception information matches the latest registration sequence number, transmits a registration notification to the effect that the message has been registered, to the information processing apparatus, whereas when the registration sequence number indicated by the reception information does not match the latest registration sequence number, said notification unit transmits a confirmation notification to the effect that there is a latest message other than the message of which the posting request has been made by the information processing apparatus, to the information processing apparatus, and wherein upon receipt of the confirmation notification, said display control unit displays update information to the effect that there is the latest message, and an icon for performing intervening posting, on the display section.

14. The information processing apparatus according to claim 13, further comprising a determination unit configured to determine whether or not the message has been registered according to the registration notification or the confirmation notification from the server apparatus, wherein if said determination unit determines that the message has not been registered, said display control unit displays not only the update information and the icon, but also a screen for re-inputting a message.

15. An information processing system including:

a server apparatus that is connected to at least one information processing apparatus via a network, for receiving a message posted from the information processing apparatus to make the message open to the public, and the at least one information processing apparatus connected to server apparatus via the network, wherein the server apparatus comprises:

a generation unit configured to, whenever receiving a posting request for posting a message from the information processing apparatus, generate a posting reception notification which indicates information related to a reception sequence number of the posting request;
a transmission unit configured to transmit the posting reception notification to the information processing apparatus; and
a storage unit configured to receive not only the message posted from the information processing apparatus but also the posting reception notification as reception information, and store the message in a memory if there is no posting request from another information processing apparatus which has been made with a reception sequence number later in sequential order than the reception sequence number indicated by the information related to the reception sequence number indicated by the reception information,
wherein whenever said generation unit receives the posting request from the information processing apparatus, said generation unit generates latest registration sequence number information indicating that the posting request is a latest posting request at a current time, as the posting reception notification,
wherein said storage unit stores the message in the memory, when a registration sequence number as the reception sequence number indicated by the information related to the reception sequence number indicated by the reception information matches the latest registration sequence number,
wherein, when the registration sequence number indicated by the reception information matches the latest registration sequence number, said transmission unit transmits a registration notification to the effect that the message has been registered, to the information processing apparatus, whereas when the registration sequence number indicated by the reception information does not match the latest registration sequence number, said transmission unit transmits a confirmation notification to the effect that there is a latest message other than the message of which the posting request has been made by the information processing apparatus, to the information processing apparatus, and
wherein the information processing apparatus comprises a display control unit configured to, upon receipt of the transmission reception notification from the server apparatus, display a message input screen for inputting the message, on a display section.

16. A method of controlling a server apparatus that is connected to at least one information processing apparatus via a network, for receiving a message posted from the information processing apparatus to make the message open to the public, comprising:
generating, whenever receiving a posting request for posting a message from the information processing apparatus, a posting reception notification which indicates information related to a reception sequence number of the posting request;
transmitting the posting reception notification to the information processing apparatus; and
receiving not only the message posted from the information processing apparatus but also the posting reception notification as reception information, and storing the message in a memory if there is no posting request from another information processing apparatus which has been made with a reception sequence number later in sequential order than the reception sequence number indicated by the information related to the reception sequence number indicated by the reception information,
wherein whenever the posting request from the information processing apparatus is received, latest registration sequence number information indicating that the posting request is a latest posting request at a current time is generated as the posting reception notification,
wherein when a registration sequence number as the reception sequence number indicated by the information related to the reception sequence number indicated by the reception information matches the latest registration sequence number, the message is stored in the memory, and
wherein when the registration sequence number indicated by the reception information matches the latest registration sequence number, a registration notification to the effect that the message has been registered is transmitted to the information processing apparatus, whereas when the registration sequence number indicated by the reception information does not match the latest registration sequence number, a confirmation notification to the effect that there is a latest message other than the message of which the posting request has been made by the information processing apparatus is transmitted to the information processing apparatus.

17. A non-transitory computer-readable storage medium storing a computer-executable program for executing a method of controlling a server apparatus that is connected to at least one information processing apparatus via a network, for receiving a message posted from the information processing apparatus to make the message open to the public, wherein the method comprises:
generating, whenever receiving a posting request for posting a message from the information processing apparatus, a posting reception notification which indicates information related to a reception sequence number of the posting request;
transmitting the posting reception notification to the information processing apparatus; and
receiving not only the message posted from the information processing apparatus but also the posting reception notification as reception information, and storing the message in a memory if there is no posting request from another information processing apparatus which has been made with a reception sequence number later in sequential order than the reception sequence number indicated by the information related to the reception sequence number indicated by the reception information,
wherein whenever the posting request from the information processing apparatus is received, latest registration sequence number information indicating that the posting request is a latest posting request at a current time is generated as the posting reception notification,
wherein when a registration sequence number as the reception sequence number indicated by the information related to the reception sequence number indicated by the reception information matches the latest registration sequence number, the message is stored in the memory, and
wherein when the registration sequence number indicated by the reception information matches the latest registration sequence number, a registration notification to the effect that the message has been registered is transmitted to the information processing apparatus, whereas when the registration sequence number indicated by the reception information does not match the latest registration sequence number, a confirmation notification to the effect that there is a latest message other than the message of which the posting request has been made by the information processing apparatus is transmitted to the information processing apparatus.

* * * * *